United States Patent
Crocker

(10) Patent No.: US 9,639,992 B2
(45) Date of Patent: May 2, 2017

(54) METHODS AND SYSTEMS FOR MULTILEVEL EDITING OF SUBDIVIDED POLYGONAL DATA

(71) Applicant: IntegrityWare, Inc., San Diego, CA (US)

(72) Inventor: Gary Arnold Crocker, San Diego, CA (US)

(73) Assignee: IntegrityWare, Inc., San Diego, CA (US)

( * ) Notice: Subject to any disclaimer, the term of this patent is extended or adjusted under 35 U.S.C. 154(b) by 47 days.

(21) Appl. No.: 14/530,640

(22) Filed: Oct. 31, 2014

(65) Prior Publication Data

US 2016/0125659 A1    May 5, 2016

(51) Int. Cl.
*G06T 19/20*    (2011.01)
*G06T 17/20*    (2006.01)

(52) U.S. Cl.
CPC .............. *G06T 19/20* (2013.01); *G06T 17/20* (2013.01); *G06T 17/205* (2013.01); *G06T 2210/36* (2013.01); *G06T 2219/2021* (2013.01)

(58) Field of Classification Search
CPC ... G06T 17/20; G06T 17/205; G06T 2210/12; G06T 2219/2021; G06F 3/048–3/04897; G06F 17/50
See application file for complete search history.

(56) References Cited

U.S. PATENT DOCUMENTS

| | | | | |
|---|---|---|---|---|
| 5,615,319 A | * | 3/1997 | Metzger ................ | G06T 11/203 345/427 |
| 2006/0206509 A1 | * | 9/2006 | Steliaros ................ | G06T 9/001 |
| 2009/0115796 A1 | * | 5/2009 | Weese .................... | G06T 7/0083 345/619 |

OTHER PUBLICATIONS

Feng, Jieqing, et al. "Multiresolution free-form deformation with subdivision surface of arbitrary topology." The Visual Computer 22.1 (2006): 28-42.*
Zorin, Denis, Peter Schröder, and Wim Sweldens. "Interactive multiresolution mesh editing." Proceedings of the 24th annual conference on Computer graphics and interactive techniques. ACM Press/Addison-Wesley Publishing Co., 1997.*

* cited by examiner

*Primary Examiner* — Daniel Hajnik

(57) ABSTRACT

Methods and systems of editing an electronic geometric model are disclosed. The method includes receiving a first indication which indicates that a portion of the polygonal data is to be modified, and moving a first vertex of the plurality of vertices from a first subdivision position defined by a subdivision algorithm to a second position. The movement of the first vertex from the first subdivision position to the second position results in a modification of the polygonal data. The method also includes generating a first vector identifying the movement of the first vertex from the first subdivision position to the second position, which first vector is defined by an initial point at the first subdivision position of the first vertex and a terminal point at the second position of the of the first vertex, and associating the first vector with the subdivision position of the first vertex.

18 Claims, 9 Drawing Sheets

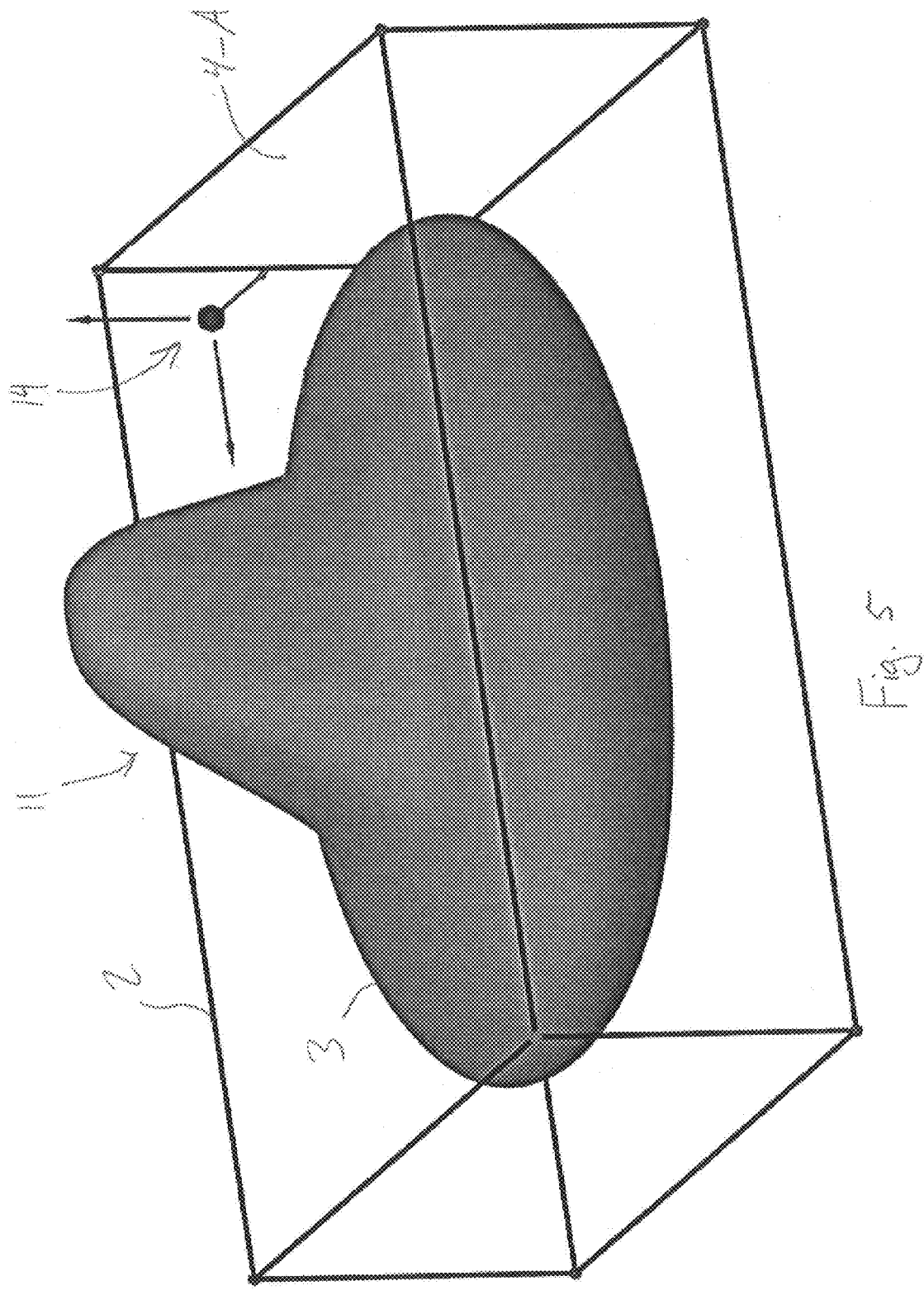

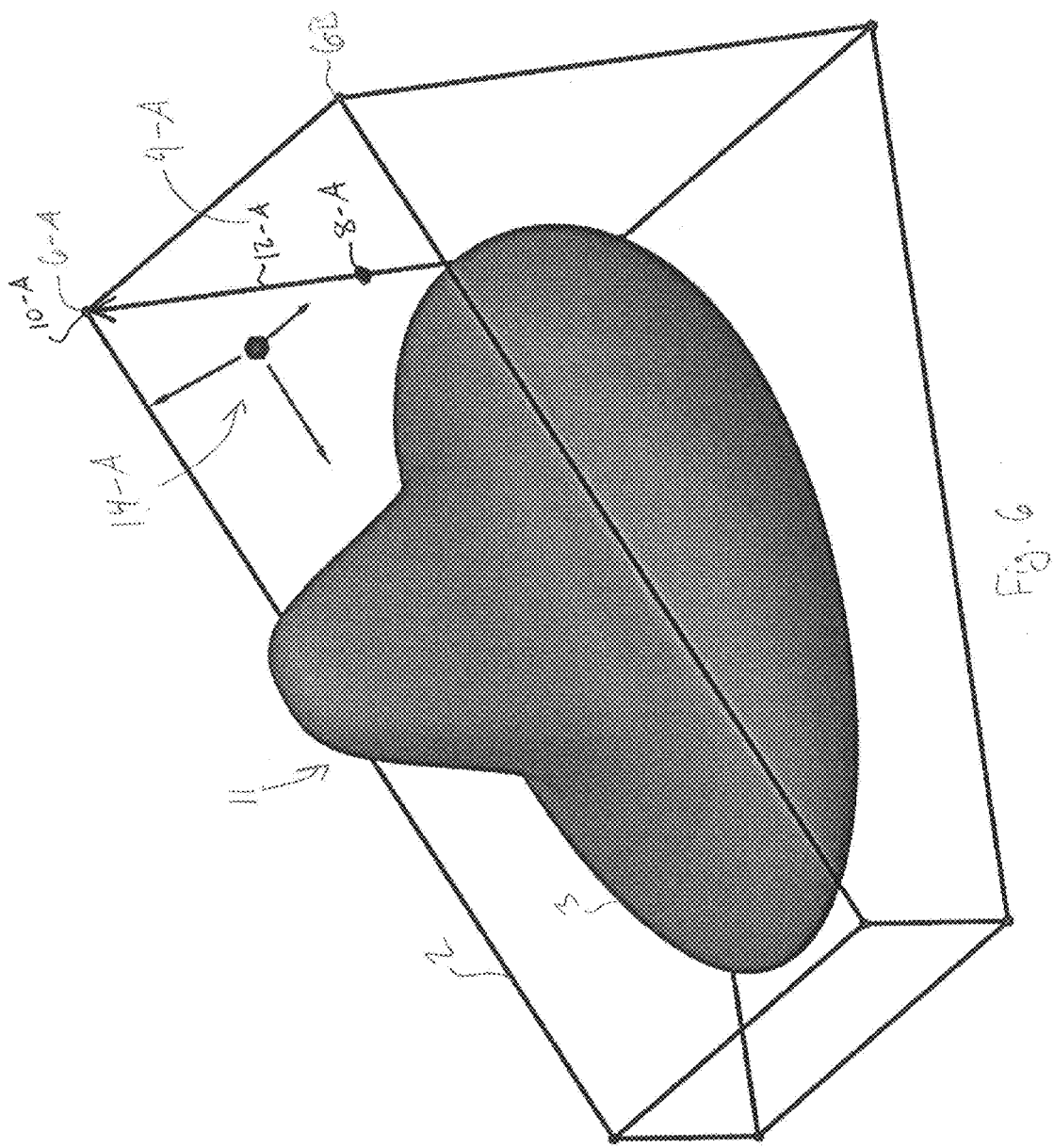

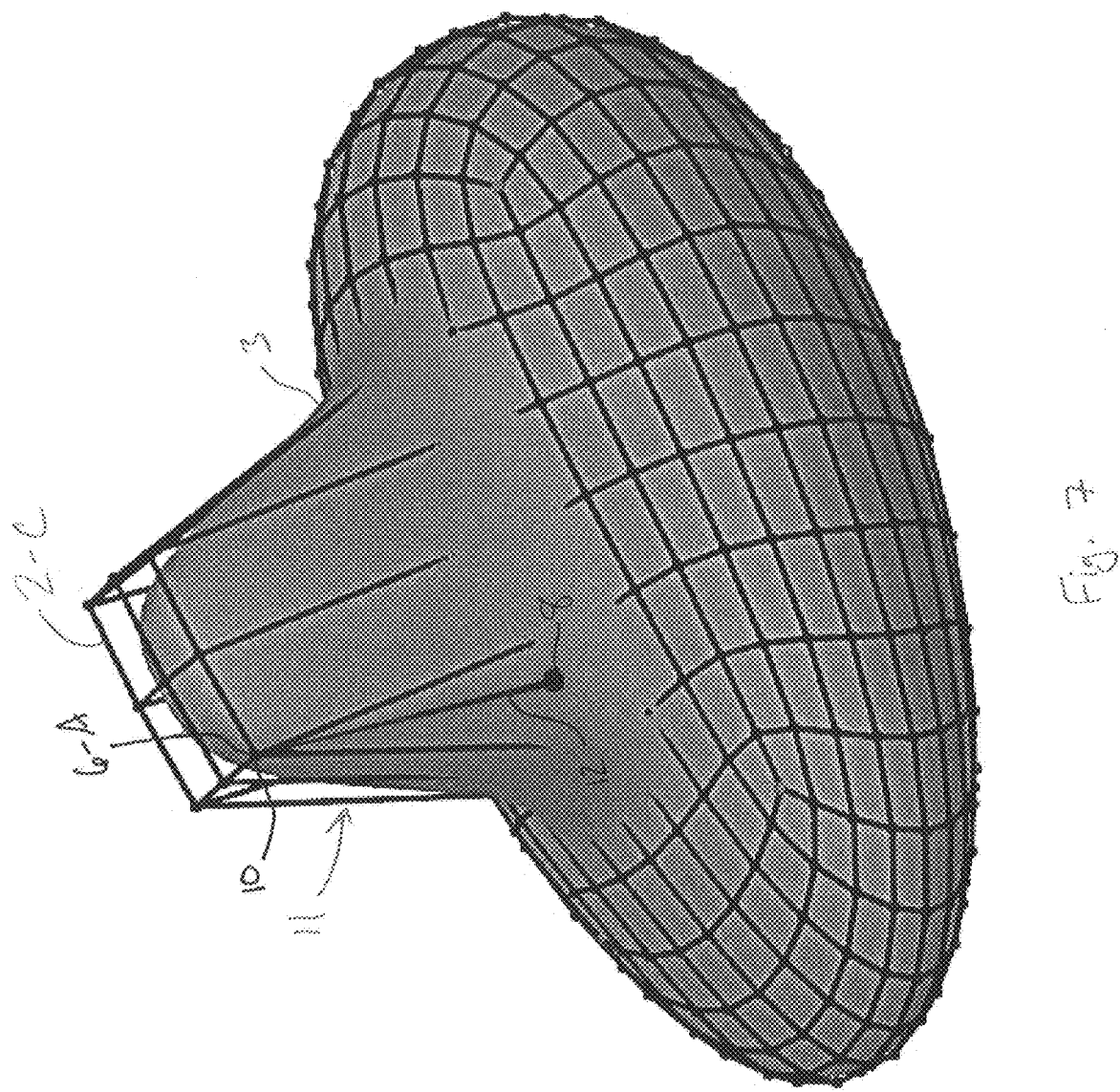

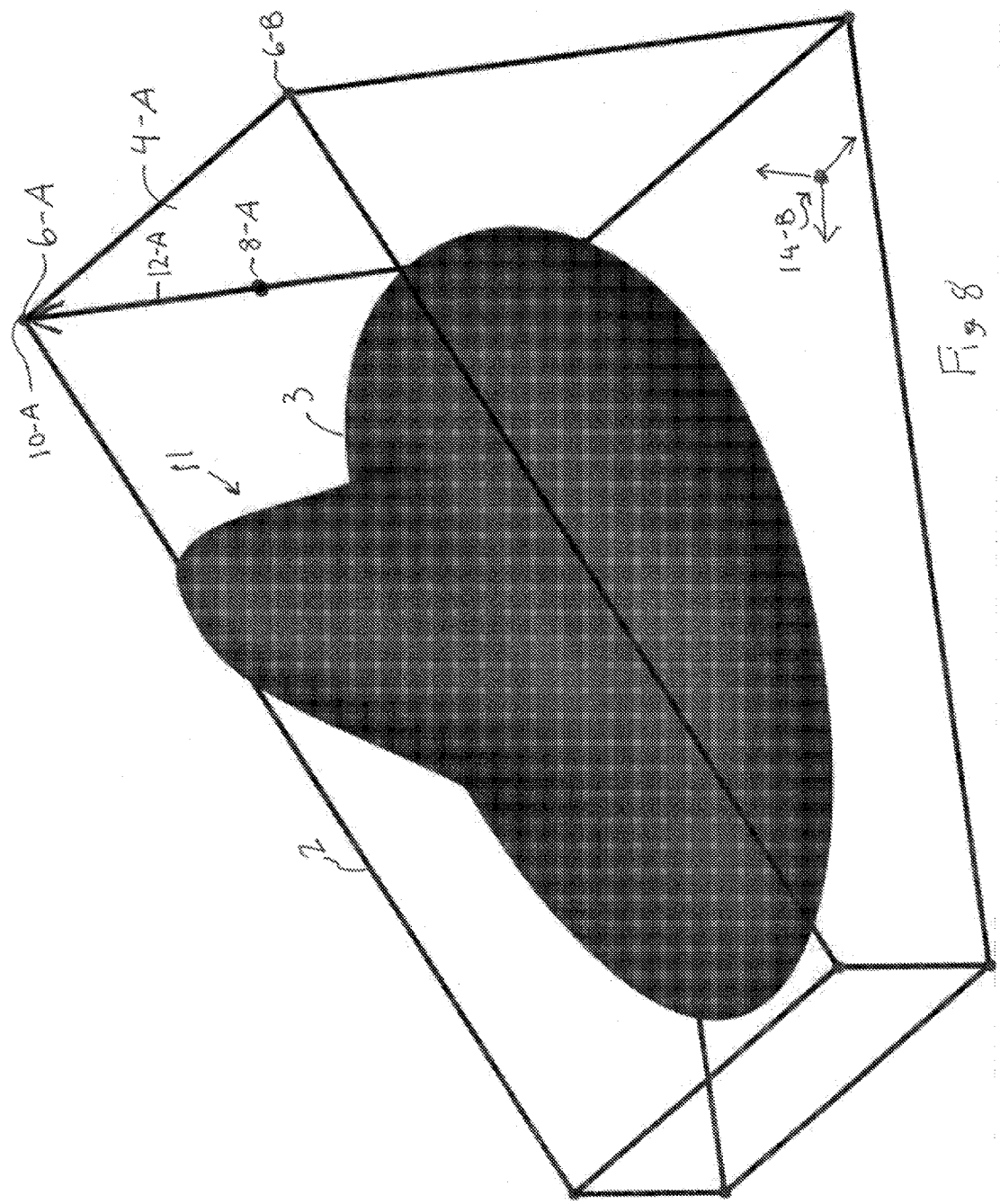

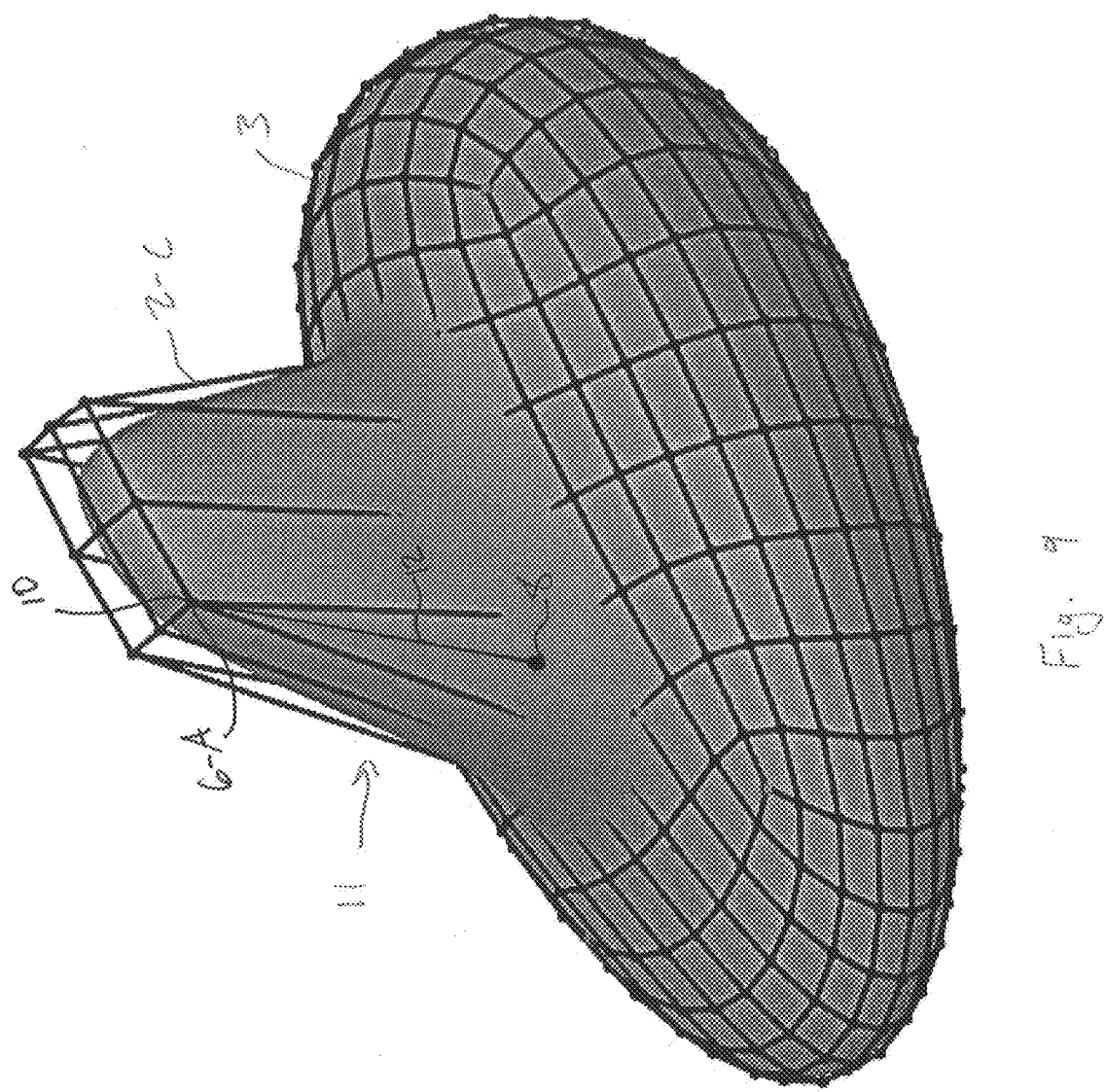

METHODS AND SYSTEMS FOR MULTILEVEL EDITING OF SUBDIVIDED POLYGONAL DATA

BACKGROUND

Field

The described technology relates to systems and methods of editing graphical information representing a polygonal data object.

Description of the Related Technology

Polygonal model data is created with, for example, a 3-D CAD software tool by, for example, a designer. The polygonal model or polygonal mesh includes discrete data points describing one or more surfaces or objects. The polygonal (or geometric) model, or data object, includes a number of geometries, such as vertices, edges, and faces. Polygonal models are convenient for design work at least because they define the surface or object with a degree of detail convenient for the designer to work with. The shape of the surface or object is defined by the data points, and the surface between the data points is perceived, but is not necessarily represented in the data. This allows for the CAD system to function quicker because of a significantly reduced data set representing the surface or object, while providing the designer enough detail to manipulate to achieve a desired design.

The polygonal data may be edited by a designer according to the designer's purposes. For example, the designer may add features to the object represented by the polygonal data using mesh operations. In addition, to create smooth, natural looking objects, a smoothing algorithm may be used to modify the polygonal data. For example, a Catmull-Clark algorithm or a Loop subdivision algorithm may be performed on the polygonal data. The smoothing algorithm modifies the polygonal data by, for example, adding vertices and repositioning existing vertices. Thus, the smoothing algorithm generates a modified object.

Typically the polygonal data is shown on a display with the smoothed object. As the designer edits the polygonal data in the design process, the smoothed object is updated to show the result of the designers edit. When editing the polygonal data, the designer starts with coarse edits at the lowest resolution and proceeds to higher resolution to make finer edits. While the higher resolution allows the finer edits, this higher resolution also increases the size of the file storing the polygonal data which slows processing and increases the computing resources needed to manipulate the polygonal data.

SUMMARY OF CERTAIN INVENTIVE ASPECTS

One aspect includes a method of editing an electronic geometric model with a computer system. The method include accessing electronic data including polygonal data defining a surface, which polygonal data comprises a plurality of vertices, receiving a first indication from a user, which first indication indicates that a portion of the polygonal data is to be modified, moving a first vertex of the plurality of vertices from a first subdivision position defined by a subdivision algorithm to a second position, which movement of the first vertex from the first subdivision position to the second position results in a modification of the polygonal data according to the first indication, generating a first vector identifying the movement of the first vertex from the first subdivision position to the second position, which first vector is defined by an initial point at the first subdivision position of the first vertex and a terminal point at the second position of the of the first vertex, associating the first vector with the subdivision position of the first vertex, and storing the first vector.

In some embodiments, storing the first vector includes determining the magnitude and direction of the vector, and storing data identifying the magnitude, direction, and first subdivision position of the first vertex. In some embodiments, the first indication is received when the polygonal data is at a first level of subdivision. In some embodiments, the first subdivision position is at a first position in space. In some embodiments, the method includes after storing the first vector, receiving a second indication from the user to move to a second level of subdivision, which second level of subdivision is lower than the first level of subdivision, and changing to the second level of subdivision by eliminating some of the plurality of vertices from the polygonal data.

In some embodiments, the first vertex is eliminated by moving from the first level of subdivision to the second level of subdivision. In some embodiments, the method includes receiving a third indication from the user, which third indication indicates that a second portion of the polygonal data is to be modified. In some embodiments the method includes moving a second vertex of the plurality of vertices from a second subdivision position defined by a subdivision algorithm to a third position, which movement of the second vertex from the second subdivision position to the third position results in a modification of the polygonal data according to the third indication.

In some embodiments, the method includes generating a second vector identifying the movement of the second vertex from the second subdivision position to the third position, which vector is defined by an initial point at the second subdivision position of the second vertex and a terminal point at the third position of the of the second vertex, associating the second vector with the second subdivision position of the second vertex, and storing the second vector. In some embodiments, the stored first vector is not affected by the moving of the second vertex. In some embodiments, the method includes after storing the second vector, receiving a fourth indication from the user to move to a third level of subdivision, which third level of subdivision is higher than the second level of subdivision, and moving to the third level of subdivision by adding vertices to the polygonal data.

In some embodiments, the third level of subdivision is the same as the first level of subdivision. In some embodiments, the first vertex is regenerated by moving from the second level of subdivision to the third level of subdivision. In some embodiments, the first vertex is regenerated at the first subdivision position. In some embodiments, the first vertex is regenerated at a second position in space. In some embodiments, the second position in space is different than the first position in space.

In some embodiments, the method can include recreating the modification indicated by the first indication by: retrieving the data identifying the magnitude, direction, and first subdivision position of the first vertex, recreating the first vector from the retrieved data, determining the second position of the first vertex by applying the recreated first vector to the first vertex at the first subdivision position, and moving the first vertex to the second position. In some embodiments, the methods outlined above can be implemented by a processor according to coded instruction stored in memory associated by the processor. The processor can be additionally connected with a user interface that can include, for example, a display and a user input such as a keyboard, a mouse, or the like. The processor can execute the coded instruction according to one or several inputs provided by the user, and can direct the providing of one or several outputs to the user via the user interface.

BRIEF DESCRIPTION OF THE DRAWINGS

FIG. 5 is perspective view of one embodiment of an edited data object at a first level of subdivision.

FIG. 6 is perspective view of one embodiment of a multiply-edited data object having a reoriented coordinate system at a first level of subdivision.

FIG. 7 is perspective view of one embodiment of a multiply-edited data object having a reoriented coordinate system at a fourth level of subdivision.

FIG. 8 is perspective view of one embodiment of a multiply-edited data object having a non-reoriented coordinate system at a first level of subdivision.

FIG. 9 is perspective view of one embodiment of a multiply-edited data object having a non-reoriented coordinate system at a fourth level of subdivision.

DETAILED DESCRIPTION OF CERTAIN INVENTIVE EMBODIMENTS

Various aspects and features of methods and systems are described herein with reference to the accompanying drawings, which show certain exemplary embodiments. The described embodiments may be modified in various ways, without departing from the spirit or scope of the present invention or inventions. In addition, the described embodiments have multiple features and aspects, no single one of which is solely responsible for the desirable characteristics of the embodiments. Furthermore, no single feature or aspect is essential to practicing the methods and systems described herein. Furthermore, various features and aspects of the embodiments may be combined in embodiments not specifically described.

Various inventive aspects of certain embodiments of methods and systems for editing polygonal data at multiple levels of resolution are discussed. The methods and systems access polygonal data which describe discrete points of a geometric object. The methods and systems use a smoothing algorithm, such as, but not limited to, a Catmull-Clark or Loop subdivision algorithm to smooth the geometric object. The smoothed version of the polygonal data may be simultaneously displayed with a representation of the polygonal data. A designer may modify the polygonal data using a CAD software tool. As the polygonal data is modified, the smoothed version may be automatically updated in response to the modification of the polygonal data.

The methods and systems allow editing of the polygonal data at one level of resolution and moving to either a higher or lower level of resolution without loss of the edits to the polygonal data. This is accomplished by the generation of one or several vectors to track the changes to the polygonal data caused by the edits, and specifically to track movements of one or several vertices in the polygonal data caused by the edits. In such an embodiment, one vector is associated with a vertex such that the initial point of the vector is located at the unedited position of the vertex, and the terminal point of the vector is located at the edited position of the vertex.

Figure 1:
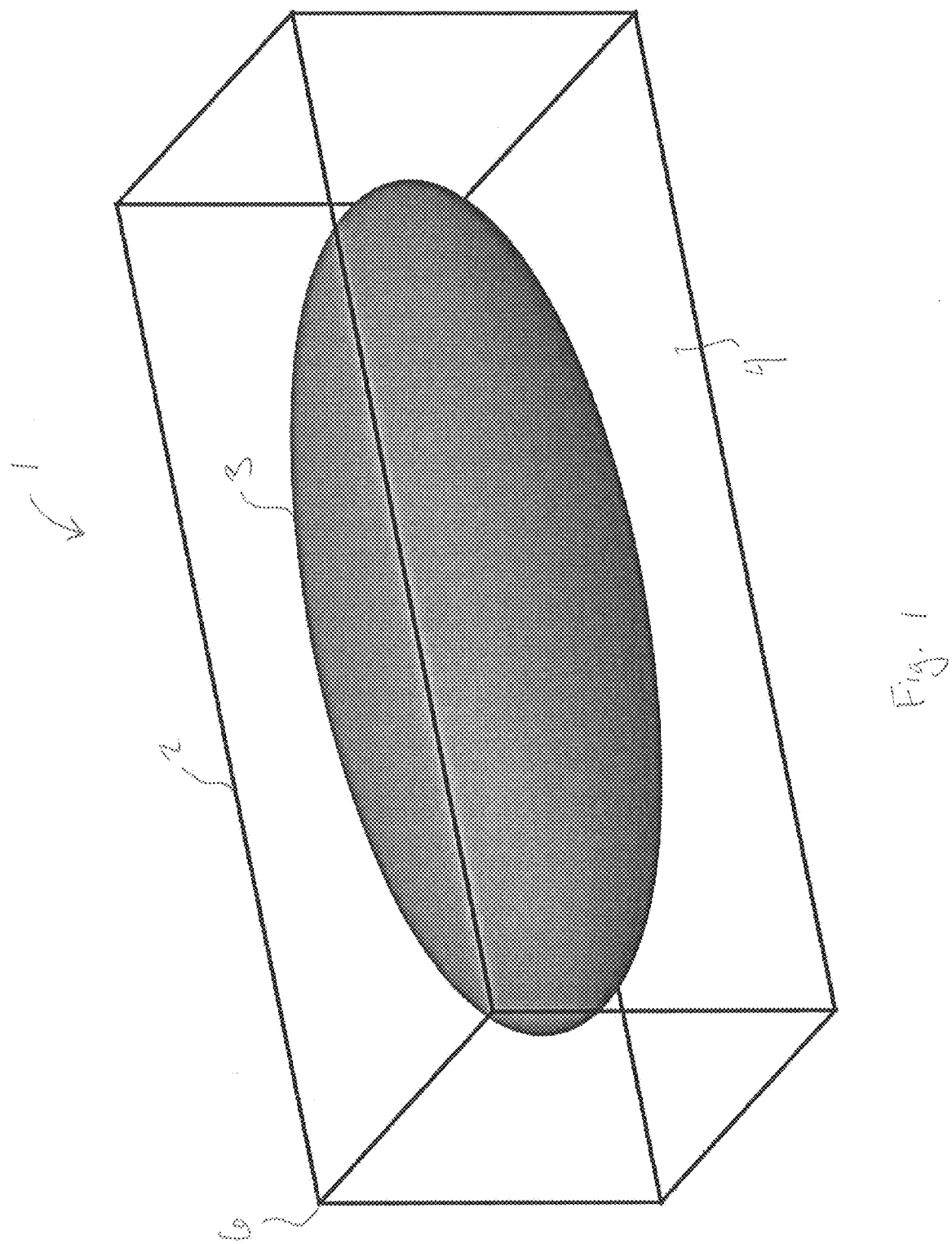
FIG. 1 is perspective view of one embodiment of a data object at a first level of subdivision.

For example, the computer system may access electronic data which describes polygonal data object 1, such as that represented in FIG. 1. In this example, the polygonal data object 1 is manipulated by a control mesh 2 that controls a smoothed version 3 of the control mesh 2. The smoothed version 3 can be achieved by the application of a smoothing algorithm to the control mesh 2.

Figure 2:
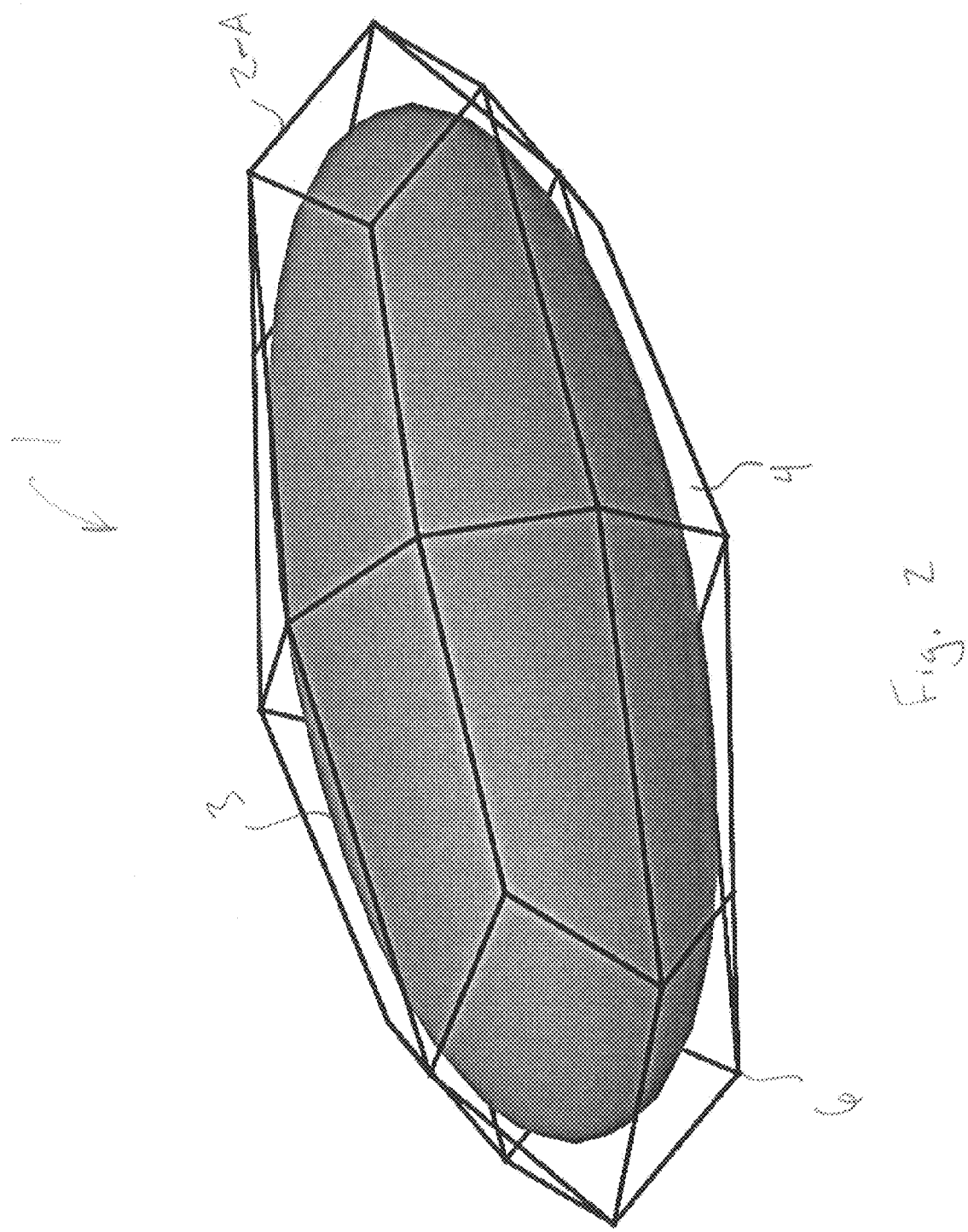
FIG. 2 is perspective view of one embodiment of a data object at a second level of subdivision.
Figure 3:
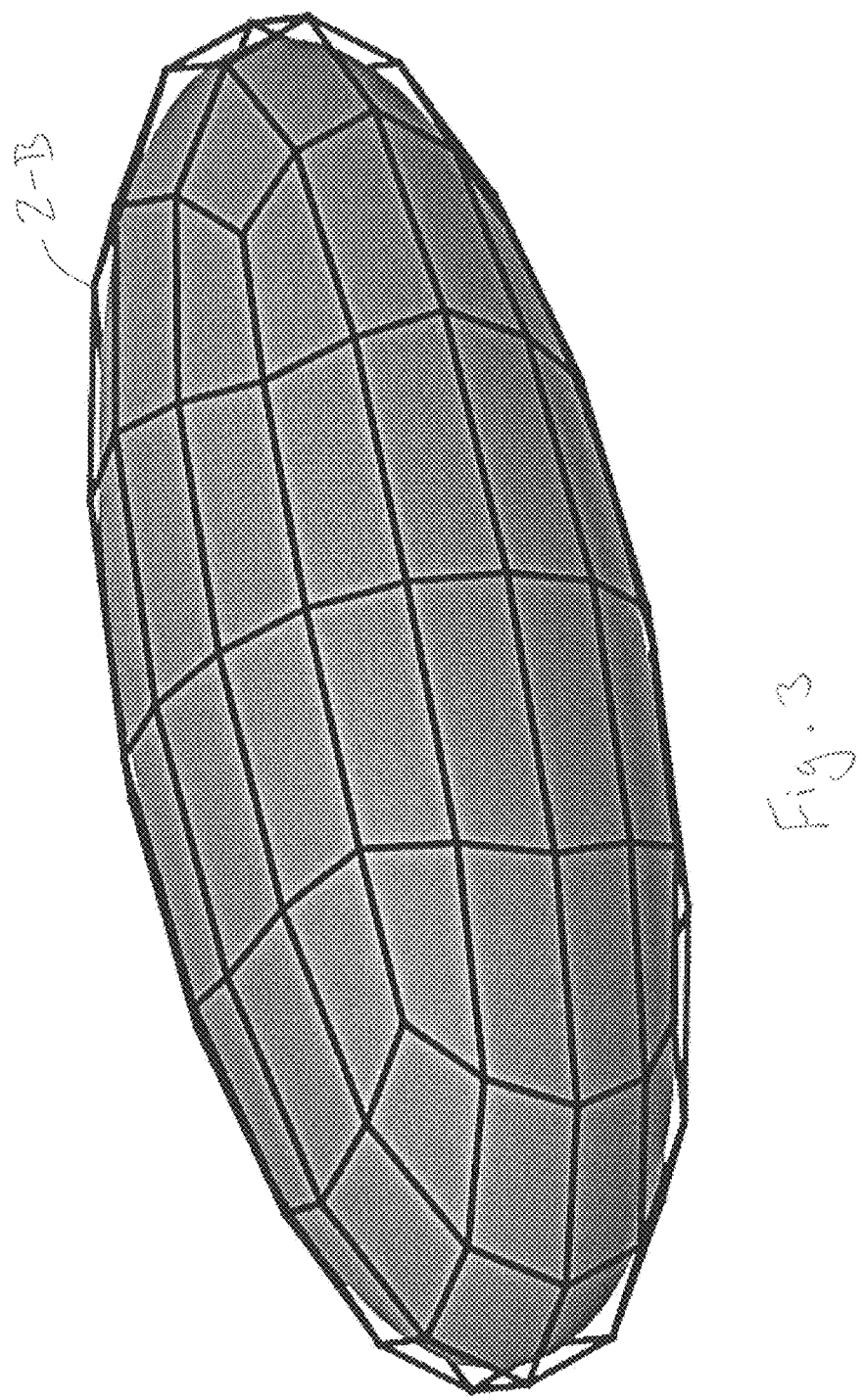
FIG. 3 is perspective view of one embodiment of a data object at a third level of subdivision.

The control mesh 2 may include one or several faces 4 and/or vertices 6. The one or several faces 4 and/or vertices 6 can be moved relative to each other to edit the control mesh 2 and to thereby edit the smoothed version 3 of the control mesh. The control mesh 2 can be provided and/or displayed at any desired level of subdivision, which different levels of subdivision include more or fewer faces 4 and vertices 6 than shown in FIG. 1. Thus, as seen in FIG. 2, the control mesh 2-A is displayed at a higher level of subdivision than the control mesh 2 of FIG. 1, and has more faces 4 and vertices 6. Although the control mesh 2-A shown in FIG. 2 is at a higher level of subdivision, it still defines the same smoothed version 3, as the application of the smoothing algorithm to the control mesh 2-A would result in the same smoothed version 3 as would be achieved by the application of the smoothing algorithm to the control mesh 2. Similarly, the control mesh 2-B shown in FIG. 3 is at an even higher level of subdivision than control mesh 2-A and thus has more faces 4 and vectors 6 than control mesh 2-A. Further, similar to the control mesh 2-A of FIG. 2, control mesh 2-B defines the same smoothed version 3 as defined in FIGS. 1 and 2 as application of the smoothing algorithm to control mesh 2-B would create the same smoothed version 3 as would be created by the application of the smoothing algorithm to control meshes 2, 2-A.

In some embodiments, the control meshes 2, 2-A, 2-B are organized into a family of control meshes. A family of control meshes are control meshes that create the same smoothed version 3 when a smoothing algorithm is applied to the unedited control meshes of the family. In this family, a control mesh of lower resolution is a parent control mesh of a control mesh of a higher resolution. Thus, control mesh 2 is a parent to control mesh 2-A, and control mesh 2-A is a parent to control mesh 2-B. Similarly, the faces 4 and/or vertices 6 of the control meshes 2, 2-A, 2-B can be described in terms of parent/child relationships, wherein a parent face and/or vertex is used to create a child face and/or vertex. In some embodiments, information identifying the faces 4 and vertices 7 of a family of control meshes can be stored in a memory in one or several databases.

In some embodiments a user may move between levels of subdivision to enable editing of the control mesh in a desired manner. Specifically, the size of a possible edit to the control mesh is dependent of the level of subdivision of a control mesh. Thus, if the level of subdivision of the control mesh is not significantly high, a desired edit cannot be made. As such, an edit can only be performed at levels of subdivision at which one or several faces 4 and/or vertices 6 exist with which the edit is performed. Thus, as the level of subdivision of the control mesh increases, a larger number of edits can be performed, as a greater number of faces and vertices will be present in that control mesh as compared to control meshes of a lower level of subdivision. Similarly, as the level of subdivision of the control mesh increases, the size of the portion of the smoothed version affected by the edit to one or more of the faces and/or vertices decreases as the smoothed version is represented by a greater number of faces and/or vertices. Thus, by increasing the level of subdivision of the control mesh, the resolution of the control mesh increases and finer edits can be made to the control mesh, and thus finer edits can be made to the smoothed version.

Figure 4:
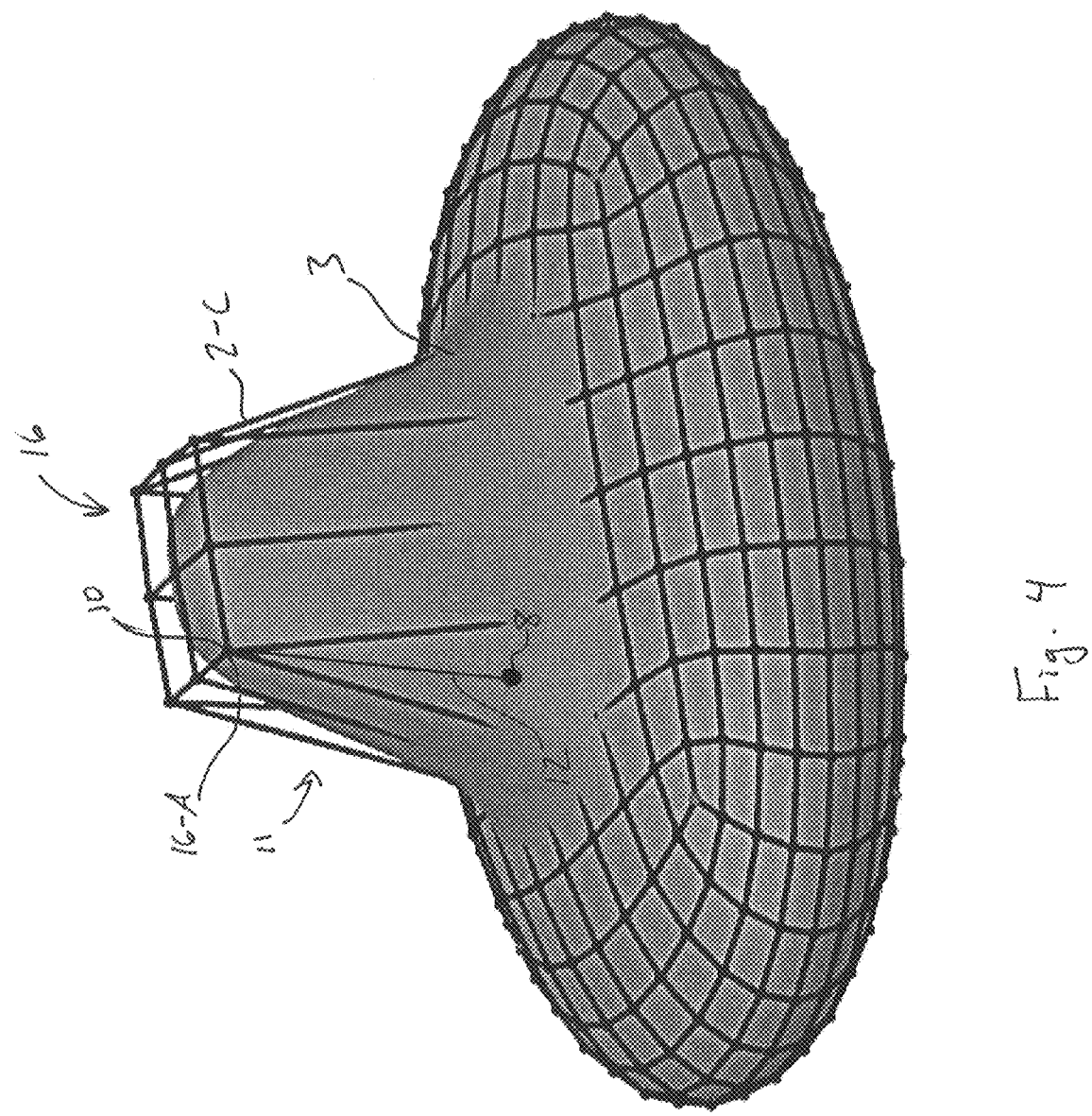
FIG. 4 is perspective view of one embodiment of an edited data object at a fourth level of subdivision.

FIG. 4 depicts a control mesh 2-C that is at a higher level of subdivision than the control meshes 2, 2-A, 2-B. As seen in FIG. 3, several of the vertices 16 have been edited and moved from first subdivision positions to second positions. Specifically, as illustrated, first vertex 16-A is moved from first subdivision position 8 to second position 10. A subdivision position is the location at which a vertex is placed by the smoothing algorithm in changing the control mesh from one subdivision level to another subdivision level. Assuming no changes to the control mesh and/or the data for creating the control mesh, the smoothing algorithm repeatedly places the vertex at the same point in space. However, a point in space can be different from a subdivision position as the control mesh and/or the data for creating the control mesh can change.

In some embodiments, the computer system can access the polygonal data of the control mesh, which polygonal data can define one or more surfaces. The methods and systems can then receive an indication from a user of a change to the polygonal data, and specifically identifies a portion of the polygonal data for modification and/or specifies the modification of a portion of the polygonal data. This indication can result in the movement of one or more of the faces and/or vertices of the polygonal data, and specifically can result in the movement of the first vertex 16-A from the first subdivision position 8 to the second position 10, which movement can deform the control mesh 2-C and the smoothed version 3 and result in the creation of protrusion 11.

In response to this movement, the computer system can generate a vector 12 that can have an initial point located at the first subdivision position 8 and a terminal point located at the second position 10. The magnitude and direction of this vector 12 can be determined, which magnitude and direction together identify how the first vertex 6-A is moved from the first subdivision position 8 to the second position 10.

The computer system can associate the first vector 12 with an aspect of the vertex from which it originates such as, for example, the first subdivision position 8. This can include storing the first vector 12 and the association between the first vector 12 and the vertex in a database in memory, and specifically can include storing the magnitude and direction of the first vector 12, and the association of the first vector 12 to a vertex. This process of generating and storing vectors can be repeated for each edited and/or moved vertex.

In some embodiments, the vector and the association to a vertex can be stored to be included in the family of vertices and/or faces to which the vertex associated with the vector belongs. This data relating to one or several families of vertices and/or faces is associated with both the polygonal data object 1 and can be used to create the control mesh/control mesh family and/or the smoothed version 3. Thus, the information relating to a family of vertices and/or faces can be embedded in the control mesh, and specifically in the data identifying a family of control meshes.

In some such embodiments, data relating to the vector can be embedded in the control mesh, regardless of the level of subdivision. This is indicated in FIG. 5 wherein the level of subdivision has been changed from the level of FIG. 4 to the level of subdivision shown in FIG. 1. While the control mesh 2 in FIG. 5 appears the same as in FIG. 1, the embedding of the data relating to the vector 12 within the control mesh 2 in FIG. 5 results in the creation of the smoothed version 3 including protrusion 11 when the smoothing algorithm is applied to control mesh 2. In some embodiments, a second indication can be received from the user, which second indication can direct a change in the level of subdivision of the control mesh to a second level that is either lower or higher than the previous level of subdivision. In the embodiment of FIG. 5, the level of subdivision has been decreased with respect to the level of subdivision of FIG. 4.

In some embodiments in which the level of subdivision is increased, this increase can occur by the creating of one or several faces and/or vertices according to the subdivision algorithm. In some embodiments, this can result in the re-creation of one or several vertices and/or faces that had been eliminated due to a decrease in the level of subdivision. These re-created one or several vertices and/or faces can be re-created at their respective subdivision positions determined by the subdivision algorithm, which subdivision positions may be at the same or different position in space as compared to when the one or several vertices and/or faces were previously created. In some embodiments, for example, in which the control mesh was edited between the creation and the recreation of the one or several vertices and/or faces, the respective positions in space of the re-created one or several vertices and/or faces may be different that the positions in space of the originally created one or several vertices and/or faces. However, although the positions in space of the one or several re-created vertices and/or vectors may change, the subdivision positions do not change.

In some embodiments, the recreation of the one or several vertices and/or faces can include determining the subdivision position for some or all of the recreated one or several vertices and/or faces, retrieving any vector data associated with the one or several vertices and/or faces, determining and/or identifying, from the retrieved vector data, the magnitude, direction, and/or associated first subdivision position of the vectors associated with the retrieved vector data, recreating the vector from the retrieved vector data by positioning the initial point of the vector at the identified associated first subdivision position, determining the second position of the first vertex according to the magnitude and direction of the vector, and by moving the first vertex to the second position.

As further seen in FIG. 5, the computer system can create and/or use of one or several coordinate systems indicated by coordinate marker 14. These one or several coordinate systems can be defined by a portion of the control mesh 2, 2-A, 2-B, 2-C, by a portion of the smoothed version 3, and/or by something external to the control mesh 2, 2-A, 2-B, 2-C or the smoothed version 3. Similarly, in some embodiments, the one or several coordinate systems can be dynamic in that they change as the things by which they are defined change, and in some embodiments, the one or several coordinate systems can be static in that they do not change. In some embodiments, one or several coordinate systems can be used to determine the direction of the vector 12. Thus, in embodiments in which the coordinate systems are dynamic, a change to the orientation of the coordinate system defining the direction of the vector 12 can result in a change in the direction of the vector with respect to a static frame of reference.

In FIG. 5, the coordinate system, as indicated by coordinate marker 14 is associated with and/or defined by face 4-A of control mesh 2. As such, changes to the face 4-A such as, for example, to the shape, size, and/or orientation of face 4-A can affect the orientation of the coordinate system. This is seen in FIG. 6, wherein vertices 6-A, 6-B have been edited and moved to thereby affect the orientation of the coordinate system indicated by coordinate marker 14-A as compared to the orientation of the coordinate system indicated by coordinate marker 14. As further seen, this has affected the direction of the vectors defining protrusion 11 such that protrusion 11 extends in the same direction with respect to the coordinate system indicated by coordinate marker 14-A, but in a different direction with respect to the coordinate system indicated by coordinate marker 14. In some embodiments, the user can select the coordinate system with which the direction of the vector is determined, and/or change the coordinate system with which the direction of the vector is determined. Thus, in some embodiments, the user can select whether a modification and/or edit to the control mesh will affect pre-existing vectors. FIGS. 6-7 and 8-9 demonstrate how different outcomes can be achieved by selecting different coordinate systems to define the direction of the vector.

In some embodiments, the editing of vertices 6-A and 6-B can be accomplished by the receipt of a third indication from the user of a change to the polygonal data, and specifically identifies an additional portion of the polygonal data, such as a second portion, for modification and/or specifies the modification of that portion of the polygonal data. This indication can result in the movement of one or more of the faces and/or vertices of the polyonal data, and specifically can result in the movement of the second vertex 6-A from the second subdivision position 8-A to the third position 10-A, which movement can deform the control mesh 2 and the smoothed version 3.

In response to this movement, the computer system can generate a second vector 12-A that can have an initial point located at the first subdivision position 8-A and a terminal point located at the third position 10-A. The magnitude and direction of this second vector 12-A can be determined, which magnitude and direction together identify how the first vertex 6-A is moved from the second subdivision position 8-A to the third position 10-A.

The computer system can associate the second vector 12-A with an aspect of the vertex from which it originates such as, for example, the second subdivision position 8-A. This can include storing the second vector 12-A and the association between the second vector 12-A and the vertex in a database in memory, and specifically can include storing the magnitude and direction of the second vector 12-A, and the association of the second vector 12-A to a vertex. This process of generating and storing vectors can be repeated for each edited and/or moved vertex.

In some embodiments, the second vector 12-A and the association to a vertex can be stored to be included in the family of vertices and/or faces to which the vertex associated with the vector belongs. This data relating to one or several families of vertices and/or faces is associated with both the polygonal data object 1 and can be used to create the control mesh/control mesh family and/or the smoothed version 3. Thus, the information relating to a family of vertices and/or faces can be embedded in the control mesh, and specifically in the data identifying a family of control meshes. In some embodiments, earlier stored vectors, including the stored first vector, are not affected later edits such as the edit resulting in the creation of the second vector 12-A. In such an embodiment, neither the magnitude nor the direction of earlier generated vectors as determined by their associated coordinate system changes. Alternatively, in some embodiments, earlier stored vectors, including the stored first vector, are affected by later edits such as the edit resulting in the creation of the second vector 12-A. In such an embodiment, one or both of the magnitude and the direction of earlier generated vectors as determined by their associated coordinate system changes.

In the embodiment of FIG. 6, the edits giving rise to the creation of the second vector 12-A do not affect the magnitude or the direction of the first vector 12, as is seen in FIG. 7 which shows the smoothed version 3 of FIG. 6 with control mesh 2-C that is at a higher level of subdivision than the control mesh 2 of FIG. 6, but is at the same level of subdivision as the control mesh 2-C shown in FIG. 4. In some embodiments, after the edits have been received that resulted in the creation of the second vector 12-A, a fourth indication can be received from the user, which fourth indication can command a change in the level of subdivision of the control mesh. In some embodiments, this change in the level of subdivision can be an increase in the level of subdivision or a decrease in the level of subdivision, which increase or decrease in the level of subdivision can result in the creation or eliminate of one or several faces and/or vertices as discussed above.

In contrast to the embodiment shown in FIG. 6-7, in the embodiment shown in FIG. 8-9, the coordinate system indicated by coordinate marker 14-B can be selected that is not affected by the edits to vertices 6-A, 6-B. In such an embodiment, when the first vector 12 is recreated, as the orientation of the coordinate system did not change, the direction of the first vector 12 also did not change. This results in a protrusion having an orientation with respect to face 4-A as shown in FIG. 8, and a direction of vector 12 shown in FIG. 9.

The various aspects, processes, and actions discussed herein may be performed sequentially or in parallel. For example, a system capable of parallel processing may divide certain procedures among the available processing devices. In addition, the various aspects, processes, and actions may be performed automatically or algorithmically by the computer system according to a program running on the computer system.

While various aspects, processes, actions, and systems have been described as being included in the embodiments discussed, the various aspects, processes, actions, and systems can be practiced with certain modifications. For example, the sequential order of the various aspects, processes, and actions may be modified. In addition, certain aspects, processes, and actions may be omitted, and other aspects, processes, and actions may be added.

What is claimed is:

1. A method of editing an electronic geometric model with a computer system, the method comprising:

accessing electronic data, the data comprising polygonal data defining a surface, wherein the polygonal data comprises a plurality of vertices;

performing a first subdivision on the polygonal data with a subdivision algorithm to generate first subdivided polygonal data, wherein the first subdivided polygonal data comprises a first plurality of subdivision vertices each having a position defined by the subdivision algorithm;

receiving a first indication from a user, wherein the first indication indicates that a portion of the first subdivided polygonal data is to be modified;

moving a first subdivision vertex of the first subdivided polygonal data from a first subdivision position defined by the subdivision algorithm to a second position, wherein the movement of the first subdivision vertex from the first subdivision position to the second position results in a modification of the first subdivided polygonal data according to the first indication;

generating a first vector identifying the movement of the first subdivision vertex from the first subdivision position to the second position, wherein the first vector is defined by an initial point at the first subdivision position of the first subdivision vertex and a terminal point at the second position of the of the first subdivision vertex;

associating the first vector with the first subdivision vertex;

storing the first vector;

performing a second subdivision on the polygonal data with the subdivision algorithm to generate second subdivided polygonal data, wherein the second subdivided polygonal data comprises a second plurality of subdivision vertices each having a position defined by the subdivision algorithm, wherein the first subdivision vertex is regenerated having a second subdivision position;

retrieving the stored first vector;

determining a new position for the regenerated first subdivision vertex based on the second subdivision position and on the first vector; and moving the regenerated first subdivision vertex to the new position.

2. The method of claim 1, wherein storing the first vector comprises determining the magnitude and direction of the vector; and storing data identifying the magnitude and the direction.

3. The method of claim 2, wherein the first indication is received when the polygonal data is at a first level of subdivision.

4. The method of claim 3, wherein the first subdivision position is at a first position in space.

5. The method of claim 4, further comprising:
after storing the first vector, receiving a second indication from the user to move to a second level of subdivision, wherein the second level of subdivision is lower than the first level of subdivision; and
changing to the second level of subdivision by eliminating some of the plurality of vertices from the polygonal data.

6. The method of claim 5, wherein the first subdivision vertex is eliminated by moving from the first level of subdivision to the second level of subdivision.

7. The method of claim 6, further comprising receiving a third indication from the user, wherein the third indication indicates that a second portion of the polygonal data is to be modified.

8. The method of claim 7, further comprising moving a second vertex of the plurality of vertices from another subdivision position defined by a subdivision algorithm to a third position, wherein the movement of the second vertex from the other subdivision position to the third position results in a modification of the polygonal data according to the third indication.

9. The method of claim 8, further comprising:
generating a second vector identifying the movement of the second vertex from the other subdivision position to the third position, wherein the vector is defined by an initial point at the other subdivision position of the second vertex and a terminal point at the third position of the of the second vertex;
associating the second vector with the other subdivision position of the second vertex; and
storing the second vector.

10. The method of claim 9, wherein the stored first vector is not affected by the moving of the second vertex.

11. The method of claim 10 further comprising:
after storing the second vector, receiving a fourth indication from the user to move to a third level of subdivision, wherein the third level of subdivision is higher than the second level of subdivision; and
moving to the third level of subdivision by adding vertices to the polygonal data.

12. The method of claim 11, wherein the third level of subdivision is the same as the first level of subdivision.

13. The method of claim 12, wherein the first subdivision vertex is regenerated by moving from the second level of subdivision to the third level of subdivision.

14. The method of claim 13, wherein the first subdivision vertex is regenerated at the first subdivision position.

15. The method of claim 14, wherein the first subdivision vertex is regenerated at a second position in space.

16. The method of claim 15, wherein the second position in space is different than the first position in space.

17. The method of claim 16, wherein determining the new position for the regenerated first subdivision vertex comprises:
retrieving the data identifying the magnitude and direction of the first subdivision vertex;
recreating the first vector from the retrieved data;
applying the recreated first vector to the first subdivision vertex at the second subdivision position; and
moving the regenerated first subdivision vertex to the new position.

18. A system comprising a processor configured to implement the method of claim 1.

* * * * *